(12) United States Patent
Ohtsuka et al.

(10) Patent No.: US 6,676,300 B2
(45) Date of Patent: Jan. 13, 2004

(54) FERRULE FOR OPTICAL CONNECTOR AND MAKING METHOD THEREOF

(75) Inventors: Kenichiro Ohtsuka, Yokohama (JP); Hiroshi Katsura, Yokohama (JP); Tomohiko Ueda, Yokohama (JP); Toshiaki Kakii, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/084,664

(22) Filed: Feb. 28, 2002

(65) Prior Publication Data

US 2002/0154867 A1 Oct. 24, 2002

Related U.S. Application Data

(63) Continuation-in-part of application No. 10/055,012, filed on Jan. 25, 2002.
(60) Provisional application No. 60/283,355, filed on Apr. 13, 2001.

(30) Foreign Application Priority Data

Jan. 25, 2001 (JP) ................................. P2001-017395
Feb. 28, 2001 (JP) ................................. P2001-055578
Mar. 30, 2001 (JP) ................................. P2001-101150

(51) Int. Cl.[7] ................................................ G02B 6/36
(52) U.S. Cl. ...................................................... 385/78
(58) Field of Search .............................. 385/78, 59, 60, 385/63, 65, 71, 83

(56) References Cited

U.S. PATENT DOCUMENTS 5,138,678 A * 8/1992 Briggs et al. ................. 385/86

6,146,024 A * 11/2000 Melchior ..................... 385/59

FOREIGN PATENT DOCUMENTS

| EP | 0052014 | 5/1982 |
|---|---|---|
| EP | 0241724 | 10/1987 |
| JP | 6-278157 | 10/1994 |
| JP | 8-278426 | 10/1996 |
| JP | 08-278426 | * 10/1996 |
| JP | 9-15453 | 1/1997 |
| JP | 10-48468 | 2/1998 |
| JP | 10-186175 | 7/1998 |
| JP | 2001-4862 | 1/2001 |

* cited by examiner

Primary Examiner—Khiem Nguyen
(74) Attorney, Agent, or Firm—McDermott, Will & Emery

(57) ABSTRACT

A ferrule for optical connector according to the present invention is provided with a fiber positioning hole, a pair of guide holes into which guide pins are inserted, and a connecting end face in which ends of the fiber positioning hole and guide holes open. A chamfer portion equivalent to a part of a surface of a body of revolution is formed at each guide hole on the connecting end face side. Further, the connecting end face is formed at an angle relative to a plane normal to the center axes of the pair of guide holes. In this structure, the slope of the connecting end face can suppress degradation of connection loss, and the provision of the chamfer portions can facilitate insertion of the guide pins, prevent damage of the connecting end face due to the guide pins, and also suppress degradation of connection loss due to the damage.

16 Claims, 7 Drawing Sheets

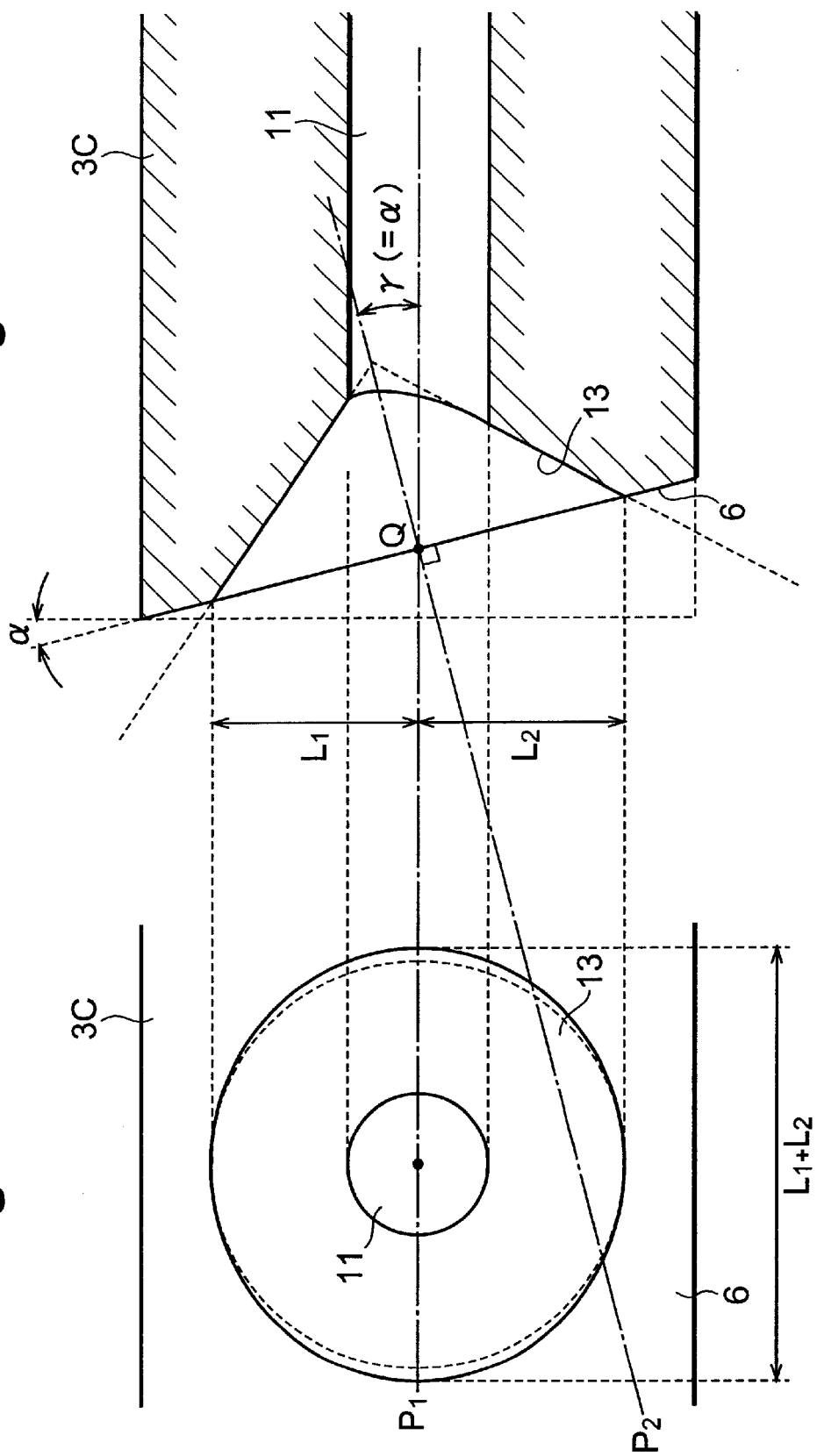

FERRULE FOR OPTICAL CONNECTOR AND MAKING METHOD THEREOF

CROSS-REFERENCE TO RELATED APPLICATIONS

This is a Continuation-In-Part application of Ser. No. 10/055,012 filed on Jan. 25, 2002 now pending, which claims the benefit of U.S. provisional application No. 60/28355 filed Apr. 13, 2001.

BACKGROUND OF THE INVENTION

1. Field of the Invention

The present invention relates to a ferrule for optical connector which is one of components of an optical connector and which positions and secures an end face of an optical fiber, and making method thereof.

2. Related Background Art

One of methods of connecting ends of optical fibers to each other is a method of providing a connector structure at the ends of optical fibers. For constructing the connector structure at the ends of optical fibers, components called ferrules are used as members for positioning and securing the ends of optical fibers, facilitating the positioning of the ends to each other, and maintaining the fibers in a connected state. For example, MT connectors and MPO connectors are commonly known as connector standards using the ferrules. An example of such known connectors is one described in the Publication of U.S. Pat. No. 6,146,024.

Upon connection of optical fibers their cores in the central portions thereof need to be positioned with accuracy, and in these MT connectors and MPO connectors guide holes and guide pins are used for positioning the cores to each other. A pair of guide holes are bored in a connecting end face of each connector and guide pins are inserted into these guide holes to position a pair of optical connectors. There were, however, cases wherein upon coupling/uncoupling of the connectors the guide pins damaged the periphery of the opening portions of the guide holes to degrade the connection state, thereby increasing transmission loss. The ferrule for optical connector described in the Publication of aforementioned U.S. Pat. No. 6,146,024 is constructed in order to solve this problem so that a taper portion is provided around the opening portion of each guide hole.

SUMMARY OF THE INVENTION

The ferrule for optical connector provided with such taper portions can suppress the increase of transmission loss described above. The inventors invented a ferrule for optical connector that can realize far superior performance. An object of the present invention is to provide a ferrule for optical connector that is configured to effect the positioning with guide pins and guide holes and that can further reduce the connection loss upon connection of connectors and making method thereof.

A ferrule for optical connector according to the present invention is a ferrule comprising a fiber positioning hole, a pair of guide holes into which guide pins are inserted, and a connecting end face in which ends of the fiber positioning hole and the guide holes open, wherein a chamfer portion equivalent to a part of a surface of a body of revolution is formed at each guide hole on the connecting end face side, and wherein the connecting end face is formed so as to have an angle relative to a plane normal to center axes of the pair of guide holes.

In this structure, the provision of the chamfer portions can facilitate the insertion of the guide pins, prevent the damage of the connecting end face caused by the guide pins, and suppress the increase of connection loss due to the damage. The provision of the chamfer portions can suppress deformation of the rear ends of guides due to the guide pins and, in turn, degradation of the connection state between connecting end faces and thus can also restrain the increase of connection loss in this respect. In the present invention, further, the connecting end face is formed so as to have the angle relative to the plane normal to the center axes of the pair of guide holes, which can decrease degradation of characteristics due to reflection at the end face of optical fiber.

The making method of this ferrule for optical connector is making a chamfer portion equivalent to a part of a surface of a body of revolution by drilling or grinding process after making ferrule body having fiber positioning holes and guide holes by plastic molding. Such making method allows making a chamfer portion having a desired shape accurately. For example, this drilling or grinding process is performed with drill whose tip is made of hard metal or diamond or rotating grindstone.

Drilling or grinding process with drill or grindstone can ease to change the shape of the chamfer portion by changing the shape of drill tip or grindstone, general versatility of processing is increased and it can increased the manufacturing accuracy of chamfer portion. Further, if the connecting end face is angled and it is necessary for making the chamfer portion corresponding to the angle of the connecting end face, the chamfer portion may be made at preferred position according to the present invention. So the freedom of making the chamfer portion is highly increased.

It is preferable here that a center axis of each chamfer portion be parallel to the center axis of each corresponding guide hole, and positioned in an area extending from the plane passing through both center axes of the pair of guide holes toward the side where the base end side of the connecting end face exists. The expression "the area extending from the plane passing through both center axes of the pair of guide holes toward the side where the base end side of the connecting end face exists" as used herein shall mean the overall area including the area occupied by such plane itself and the area extending away from such plane toward the side where the base end side of the connecting end face exists. Further, since the connecting end face formed to make an angle with the center axis of the guide hole have a tip end side and a base end side, the expression "the side where the base end side of the connecting end face exists" indicates the side on which this base end side exists.

By adopting such structure, the chamfer portions are formed at preferred positions in the inclined connecting end face, whereby the areas around the chamfer portions can be prevented from chipping and whereby the distal ends of the guide pins can be guided into the guide holes with accuracy. As a consequence, the effects of the provision of the chamfer portions can be achieved with more certainty than in the case of the chamfer portions being simply formed, and the connection loss can be reduced more.

Further, it is preferable here that when the connecting end face is formed so as to have an angle of 8° relative to the plane normal to the center axes of the two guide holes, the chamfer portions be formed so that an aperture size of each chamfer portion on the connecting end face is within a range of 1.05 to 2.0 times an inside diameter of the guide holes. When the aperture size of each chamfer portion is set within the range of 1.05 to 2.0 times the inside diameter of the guide holes, the effects of the provision of the chamfer portions can be achieved best. The setting in this range can accurately absorb fluctuations of the guide pins upon connection of connectors due to the tolerance of the ferrule itself and/or the tolerance of a housing if the ferrule is housed in the housing.

In another configuration, it is preferable that when the connecting end face is formed so as to have an angle of 8° relative to the plane normal to the center axes of the two guide holes, a deviation amount between the center axis of each chamfer portion and the center axis of each guide hole be 50–300 $\mu$m. When the deviation amount between the center axis of each chamfer portion and the center axis of each guide hole is set in the range of 50 to 300 $\mu$m, the chamfer portions on the connecting end face can be set at preferable positions, which can maximize the effects of the provision of the chamfer portions.

It is also preferable that each chamfer portion be formed so that the center axis of each chamfer portion has an angle relative to the center axis of each corresponding guide hole. It is more preferable that his relative angle is set to be not more than the angle of the connecting end face relative to the plane normal to the center axes of the guide holes. Off course, these angles may set to be equal.

By adopting such structures, the guide pins can be smoothly guided into the guide holes by the chamfer portions and the chamfer portions can be made readily. In case of equalizing these angles, it becomes feasible to enhance the positional accuracy of the chamfer portions and the like and facilitate the formation of the chamfer portions.

Preferably, the ferrule may include the filler whose average particle size is not more than 20 $\mu$m. More preferably, maximum particle size of the filler is not more than 20 $\mu$m. Such filler may be silica. Including such filler can realize the smooth surface of the chamfer portion, so when the guide pin contacts the chamfer portion, the deformation of guide pin or chamfer potion can be restrained and excessive abrasion of drilling or grinding tools can be restrained. More preferably, the surface roughness of this chamfer portion is within the range between 0.01 to 2.0 $\mu$m.

BRIEF DESCRIPTION OF THE DRAWINGS

FIG. 9A is a view, equivalent to FIG. 5A, of a second embodiment of the ferrule for optical connector according to the present invention.

FIG. 9B is a view, equivalent to FIG. 5B, of the second embodiment of the ferrule for optical connector according to the present invention.

DESCRIPTION OF THE PREFERRED EMBODIMENTS

Figure 1:
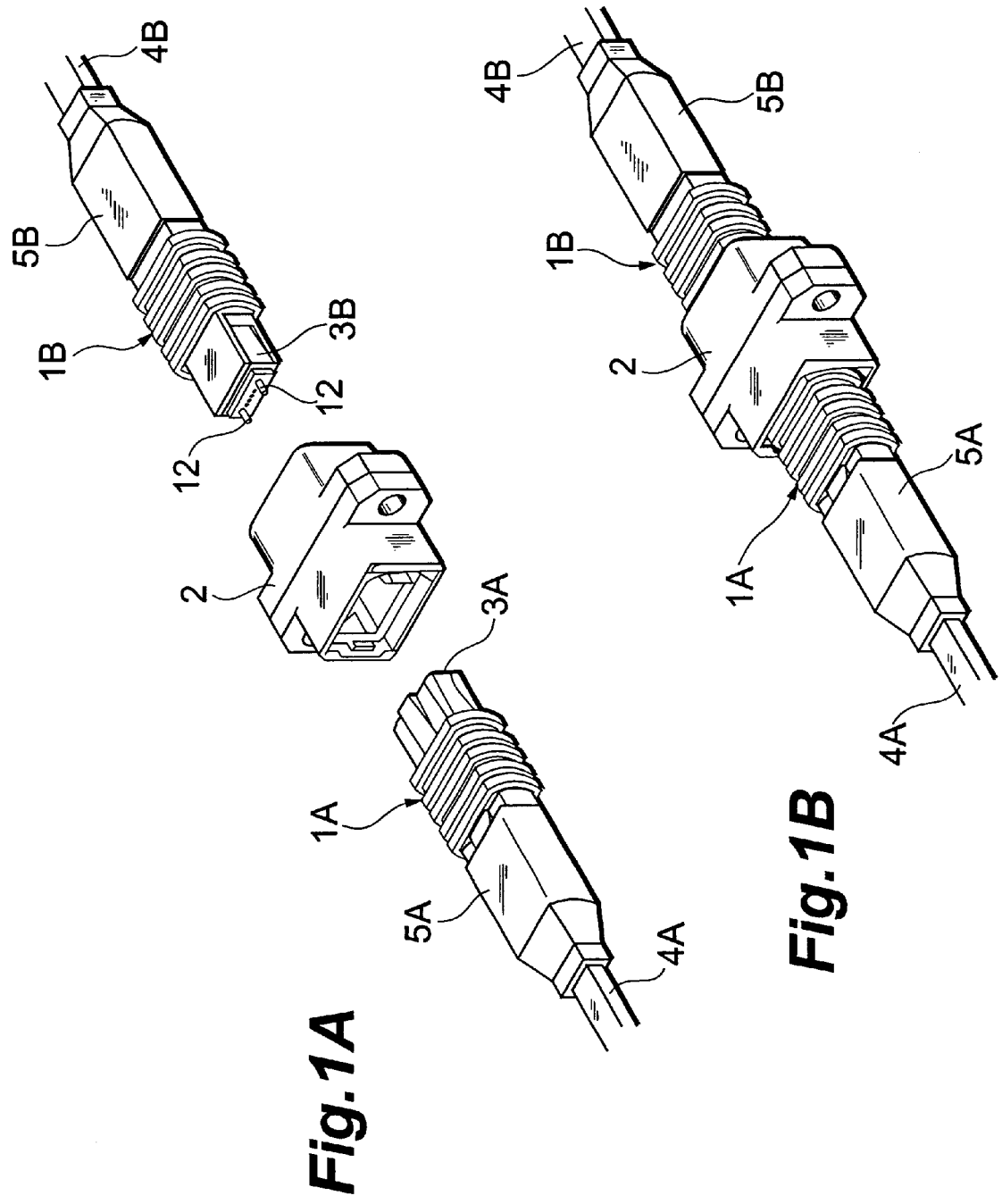
FIG. 1A is a perspective view to show the appearance in a disconnected state of optical connectors using a first embodiment of the ferrule for optical connector according to the present invention.
FIG. 1B is a perspective view to show the appearance in a connected state of the optical connectors shown in FIG. 1A.
Figure 2:
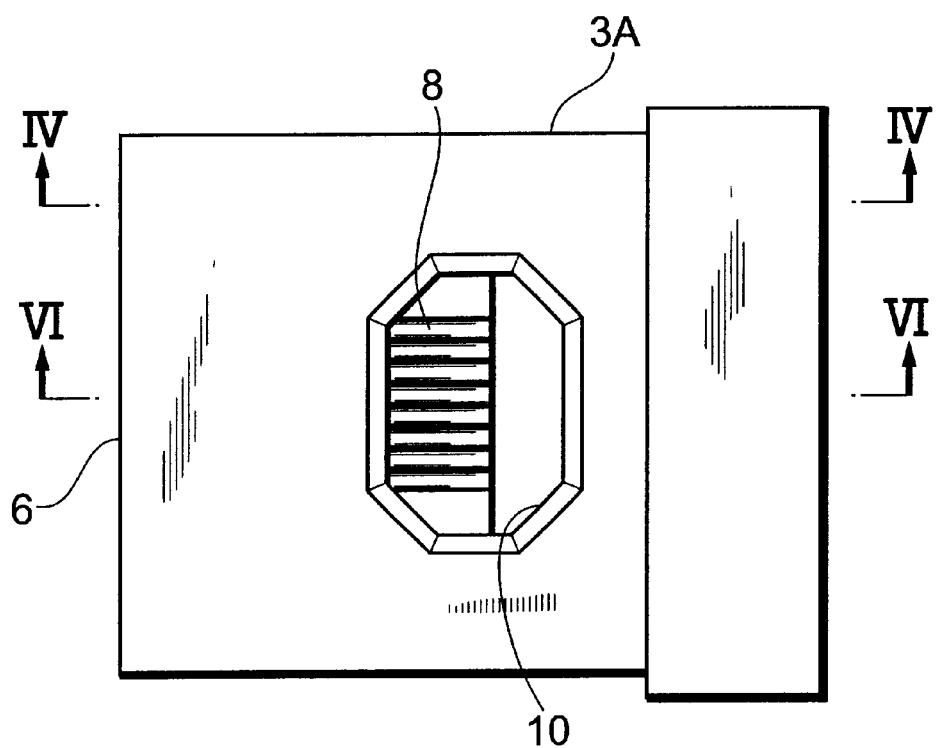
FIG. 2 is a plan view of the ferrule in the optical connector without guide pins shown in FIGS. 1A and 1B.
Figure 3:
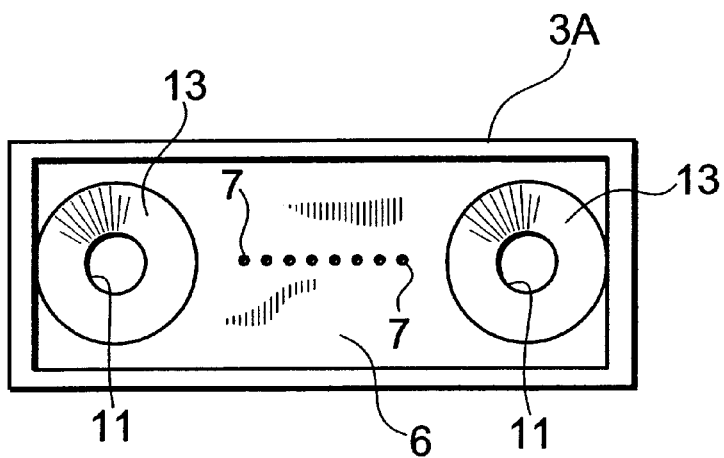
FIG. 3 is a front view on the connecting end face of the ferrule shown in FIG. 2.

The embodiments of the ferrule for optical connector according to the present invention will be described with reference to the drawings. To facilitate the comprehension of the explanation, the same reference numerals denote the same parts, where possible, throughout the drawings, and a repeated explanation will be omitted.

FIGS. 1A and 1B are perspective views showing the appearance of the optical connectors using the ferrules for optical connector according to the first embodiment of the present invention. FIG. 1A is a view showing a state before connection between the optical connectors and FIG. 1B a view showing a state of connection between the optical connectors.

In these figures, the optical connectors 1A, 1B are MPO connectors, in which the optical connector 1A is constructed as a connector without guide pins and the optical connector 1B as a connector with guide pins 12. These optical connectors 1A, 1B are detachably connected through an adapter 2.

The optical connector 1A has a ferrule 3A and a single coated optical fiber or a optical fiber ribbon 4A is assembled in this ferrule 3A. The fiber ribbon 4A used herein is a fiber ribbon of eight fibers. The optical connector 1B has a ferrule 3B and a fiber ribbon 4B having the same number of fibers as the fiber ribbon 4A is assembled in this ferrule 3B. These ferrules 3A, 3B are held in their respective housings 5A, 5B.

For enhancing strength and endurance, these ferrules 3A, 3B are made of plastic, e.g. PPS (Poly-Phenylene Sulfide) including silica filler. Mixing ratio (weight ratio) of these material is 30% PPS and 70% filler, for example.

A specific configuration of the ferrule 3A is shown in FIG. 2 to FIG. 6. In these figures, the ferrule 3A has eight fiber positioning holes 7 extending inwardly from a connecting end face (front end face) 6, which is to be joined to the partner connector 1B. A fiber ribbon receiving bore 9 communicates through fiber guide grooves 8 with the fiber positioning holes 7. When the fiber ribbon 4A is installed into this ferrule 3A, the fiber ribbon 4A is inserted into the ribbon receiving bore 9 from the rear end side of the ferrule 3A and eight optical fibers exposed from the tip of the fiber ribbon 4A are inserted into the corresponding fiber positioning holes 7.

Figure 6:
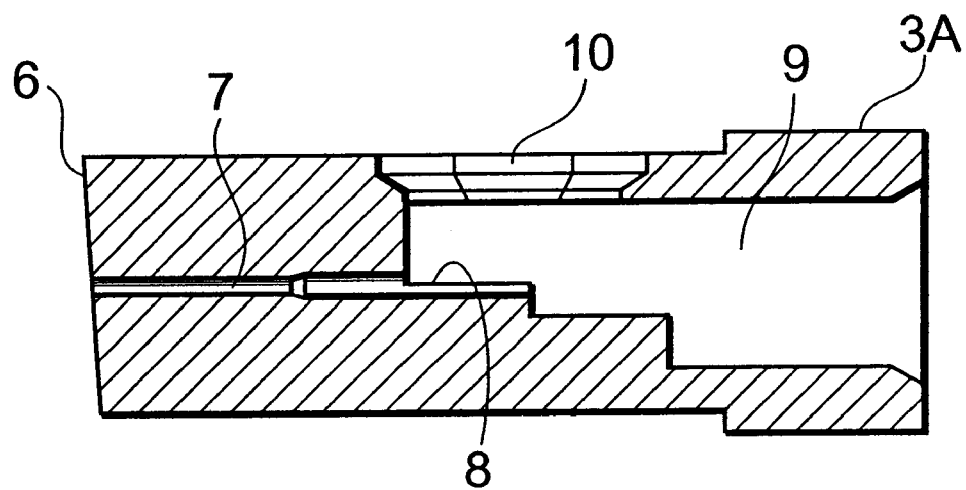
FIG. 6 is a cross-sectional view along line VI—VI of FIG. 2.

Then an adhesive is charged through an opening portion 10 formed in the top surface of the ferrule 3A to secure the optical fibers to the ferrule 3A. After the fiber ribbon 4A is installed in the ferrule 3A in this way, the front end face 6 of the ferrule 3A is polished so as to have an angle of 8° (angle $\alpha$ in FIG. 4) relative to a plane perpendicular to the center axes of the fiber positioning holes 7. (It is, however, noted that FIG. 6 is illustrated without the optical fibers.) If the distal ends of the optical fibers are also polished similarly at the angle of 8° on the occasion of this polishing, influence of optical feedback due to Fresnel reflection and the like can be reduced in a connected state of the connectors.

In another method, the connecting end face 6 is formed at the foregoing angle of 8° from the beginning and the optical fibers are fixed in a projecting state from the ends of the fiber positioning holes 7. Then the distal end faces of the optical fibers are polished so as to make right angles to the center axes of the fiber positioning holes 7 in certain cases. If the distal ends of the optical fibers are made to project a little from the connecting end face 6 after the polishing, so-called PC (Physical Contact) connection can be implemented with reduction in connection loss. During the polishing, part of the connecting end face may be polished so as to make right angles to the center axes of the fiber positioning holes 7.

On the both sides of the fiber positioning holes 7, a pair of guide holes 11 are formed from the front end face 6 of the ferrule 3A toward the interior. The pair of guide holes 11 are parallel to each other and also parallel to the fiber positioning holes 7. Guide pins 12 provided in the optical connector 1B are inserted into the respective guide holes 11.

Figures 5A, 5B:
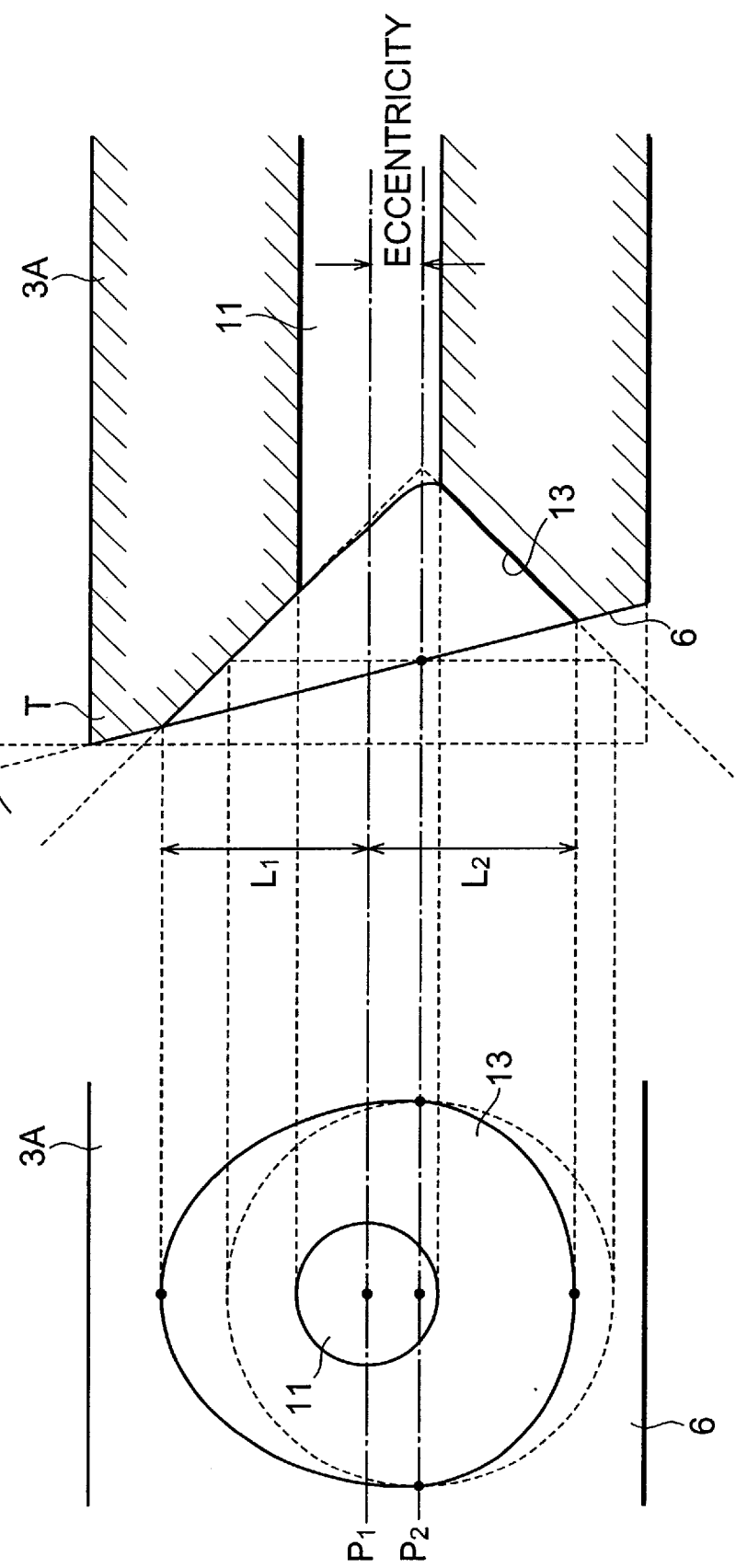
FIG. 5A is a view of a connecting end face from a direction of the center axis of a guide hole.
FIG. 5B is a cross-sectional view of the ferrule cut by a plane passing both the center axis of a guide hole and the center axis of a chamfer portion.

A chamfer portion 13 is formed at an opening edge of each guide hole 11 on the front end face 6 side, so that the opening portion of each guide hole 11 is widened toward the front end face 6 by the chamfer portion 13. The chamfer portions 13 are made in a form equivalent to a part of a surface of a body of revolution. In the present embodiment the chamfer portions 13 have the form equivalent to a part of a surface of a cone which is a body of revolution. And, as shown in FIGS. 5A and 5B, the center axis $P_1$ of each guide hole 11 and the center axis $P_2$ of the corresponding chamfer portion 13 are parallel to each other, and the center axis $P_2$ of the chamfer portion 13 is positioned in the area extending from the plane passing through both center axes $P_1$ of the guide holes 11 toward the side where the base end side of the connecting end face 6 exists. Each chamfer portion 13 has the form equivalent to a part of a surface of a body of revolution as described above, and the center axis $P_2$ of the chamfer portion 13 represents the rotation axis of this body of revolution.

As described above, the expression "the area extending from the plane passing through both center axes $P_1$ of the pair of guide holes 11 toward the side where the base end side of the connecting end face 6 exists" as used herein shall mean the overall area including "the area occupied by such plane itself" and "the area that extends away from such plane to the side where the base end side of the connecting end face 6 exists". The expression "the base end side of the connecting end face 6" indicates, when the side of the front end face 6 on which the tip end T formed to make an angle with the center axis $P_1$ of the guide hole 11 is called the tip end side, the side opposite to the tip end side. In FIG. 5, the lower side of the drawing is such "side in which the base end side exists" and the upper side thereof is the "side in which the tip end side exists". Particularly in this embodiment, the center axis $P_2$ of the chamfer portion 13 is positioned in "the area extending away from the plane" passing through both center axes $P_1$ of the guide holes 11 "toward the side where the base end side of the connecting end face 6.

Accordingly, by positioning the center axis $P_2$ of the chamfer portion 13 in the area extending from the plane defined by the center axes $P_1$ of the pair of guide holes 11 toward the side where the base end side of the connecting end face 6 exists, the chamfer portions 13 can be formed on the connecting end face 6 without lying off the connecting end face 6. Namely, distances $L_1$ and $L_2$ in FIG. 4 can be made approximately equal to each other, or the difference thereof can be reduced. Contrarily, if the center axis $P_2$ of the chamfer portion 13 is positioned in the area of the side in which the base end side of the connecting end face 6 exists more than the plane passing through both center axes $P_1$ of the pair of guide holes 11, $L_1$ would be larger than $L_2$ and the chamfer portion 13 could lie off the connecting end face 6 on the $L_1$ side.

Figure 4:
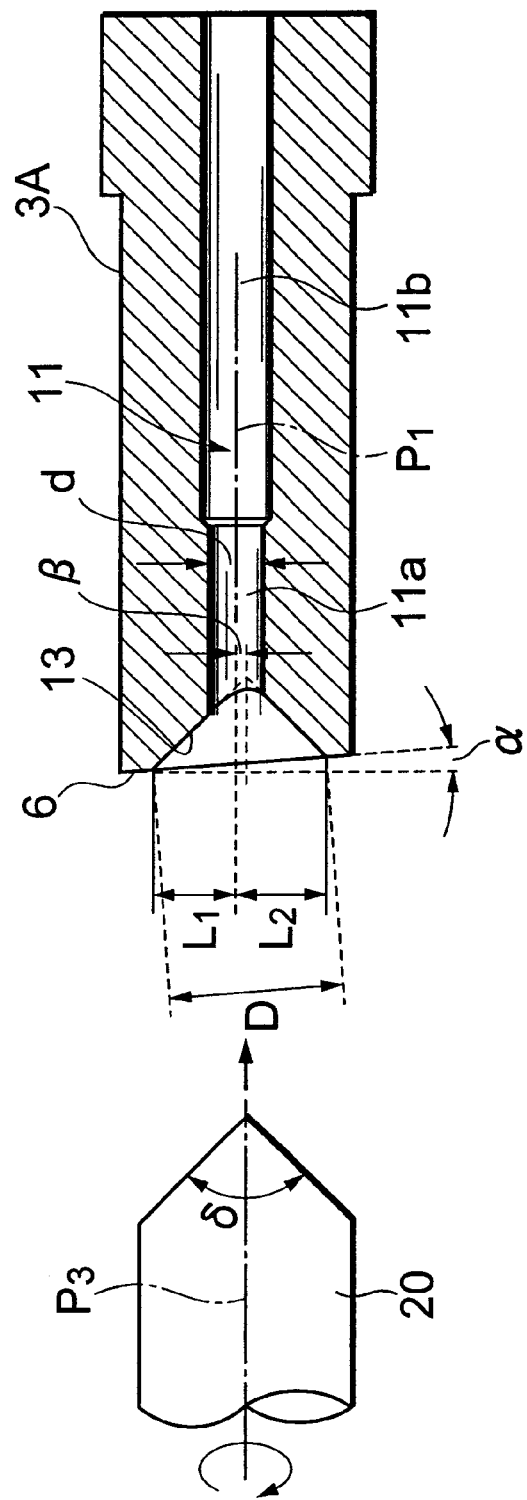
FIG. 4 is a cross-sectional view along line IV—IV of FIG. 2 with a tip of drill.

For making above described cone formed chamfer portion 13 on plastic ferrule 3A, the hard metal or diamond drill tip 20 is used as shown in FIG. 4. The center axis P3 of the drill tip 20 is staggered against the center axis P1 of the guide pin hole 11 so as to arrange the center axis P3 of the drill tip 20 and the center axis P2 of the chamfer portion 13 in a straight line as shown in FIGS. 5A and 5B. To be more specific, with keeping the state of parallel arrangement of the center axis P3 of the drill tip 20 and the center axis P1 of the guide pin hole 11 the center position of drill tip 20 is shifted given amount from the center of guide pin hole 11.

The reason of using drill tip 20 for making such chamfer portion 13 is that it is easy to change the shape of the chamfer portion 13 by only changing the shape of drill tip 20 so that the general versatility is highly increased. Further, as compared with the injection molding, the manufacturing accuracy of the chamfer portion 13 can be increased and the freedom of changing the position of the chamfer portion 13 can be increased. When the connecting end face 6 of the ferrule tilts and its tilt angle is $\alpha$, it is necessary to form the chamfer portion 13 corresponding to this angle $\alpha$. By using drill tip 20 for processing this chamfer portion 13, the chamfer portion corresponding to various angle $\alpha$ can be realized easily and certainly. It contributes to enhance productivity of ferrule 3A having tilted connecting end face 6.

It is not essential for forming the cone-shape chamfer portion 13 to parallel arrange the center axis P3 of the drill tip 20 and the center axis P1 of the guide pin hole 11 while shifting the center axis P3 of the drill tip 20 against the center axis P1 of the guide pin hole 11. However, with keeping parallel arrangement of the center axis P3 of the drill tip 20 and the center axis P1 of the guide pin hole 11, the position of the drill tip 20 is controlled by the translation operation of the drill tip 20 relative to the center axis P1 of the guide pin hole 11. So it is possible to process the chamfer potion 13 rapidly and accurately by only determining the shifted amount of P3 from P1.

Further, the point angle $\delta$ of the drill tip 20 is corresponding to the expanding angle of chamfer portion 13 which will be processed and it is experimentally demonstrated that the stability of drilling process with drill tip 20 is enhanced when the point angle $\delta$ is within the range between 90 to 150 degrees. In the case of adopting hard metal for drill tip 20, the endurance of the drill tip 20 is enhanced as keeping acceptable processing accuracy of the surface of the chamfer portion 13. Further, when the drill tip 20 is made of diamond, the endurance of the drill tip 20 is more enhanced.

FIGS. 5A and 5B show the region around the guide hole 11 and chamfer portion 13. FIG. 5A is a view of the connecting end face 6 from the direction of the center axis $P_2$ of the guide hole 11 and the chamfer portion 13, and FIG. 5B a cross-sectional view of the ferrule cut by the plane passing the both center axes $P_1$, $P_2$ of the guide hole 11 and the chamfer portion 13. In these figures, $L_1=L_2$ and the foregoing angle $\alpha$ is illustrated with some emphasis for easier understanding. In the figures $P_1$ represents the center axis of the guide hole 11 and $P_2$ the center axis of the chamfer portion 13. An eccentricity (distance) between these two center axes $P_1$, $P_2$ is not more than the radius of the guide hole 11, whereby the guide pin 12 can be smoothly guided into the guide hole 11.

By the offset of the two center axes $P_1$, $P_2$ as in the present embodiment, the chamfer portions 13 can be formed without lying off the connecting end face 6, which can satisfactorily achieve the effects of the provision of the chamfer portions 13. The effects of the provision of the chamfer portions 13 involve the effect of preventing the failure in PC connection and the damage of fiber ends due to the chipping of the ends of guide holes 11, the effect of preventing the failure in PC connection due to such deformation of the ends of the guide holes as to rise on the connecting end face 6 side, the effect of improvement in the insertion property, and so on.

When the connecting end face 6 is formed at the angle of 8° relative to the plane perpendicular to the center axes of the pair of guide holes 11, the aperture size of each chamfer portion 13 on the connecting end face 6 (D in FIG. 4) is preferably determined within the range of 1.05 to 2.0 times the inside diameter of the guide holes 11 (d in FIG. 4) The aperture size stated herein means a maximum diameter in the plane on the connecting end face 6. In the present embodiment the aperture shape of the chamfer portions 13 on the connecting end face 6 is not a regular circle, but is an ellipse or a shape close to an ellipse. Also taking these cases into consideration, the aperture size stated herein is defined as a maximum diameter.

If the aperture size of the chamfer portions 13 is less than 1.05 times the inside diameter of the guide holes 11, the chamfer portions 13 are hardly formed, so as to fail to achieve the effects of the provision of the chamfer portions 13. If on the other hand the aperture size of the chamfer portions 13 is over 2.0 times the inside diameter of the guide holes 11, the aperture size of the chamfer portions 13 becomes too large, which is not practical. In addition, when the aperture size of the chamfer portions 13 is over 2.0 times the inside diameter of the guide holes 11, the slope of the chamfer portions 13 becomes insufficient, though it depends upon the depth of the chamfer portions 13, and thus this weakens the effect of guiding the distal end of the guide pin 12 into the guide hole 11.

When the connecting end face 6 is formed at the angle of 8° relative to the plane perpendicular to the center axes of the pair of guide holes 11, the foregoing deviation between the two center axes $P_1$, $P_2$ ($\beta$ in FIG. 4) is preferably 50–300 $\mu$m. If this deviation $\beta$ is less than 50 $\mu$m, the effect of approximately equating the distances $L_1$ and $L_2$ in FIG. 4 will be weakened. If the deviation $\beta$ is over 300 $\mu$m on the other hand, the dimensional difference between $L_1$ and $L_2$ in FIG. 4 will become large. For making the deviation between the two center axes $P_1$, $P_2$, the center axis $P_2$ of the chamfer portion 13 is displaced relative to the center axis $P_1$ of the guide hole 11 in the inclining direction of the connecting end face 6 (downward in FIG. 4 and FIGS. 5A, 5B).

When the particle size of filler (above mentioned silica) included in the ferrule 3A and 3B is big, the surface of the chamfer portion 13 would be rough without depending on the making method of the chamfer portion 13 (molding or additional process, e.g. drilling process) and it enhances the susceptibility of the surface of the chamfer portion 13 to break and deform while inserting guide pin 12. Such breakage or deformation of the chamfer portion 13 occurs, it is difficult to position the guide pin 12 in guide pin hole 11 accurately. Further, while contacting the guide pin 12 to the chamfer portion 13, the friction wastage or dust etc. appears and they not only draw the damage of the chamfer portion 13 but also adhere the end face of the optical fiber so it causes the damage of the optical fiber. More specially, when the optical connector 1A and 1B are PC connected each other, the PC connection is apt to disconnect due to the embossment of the chamfer portion 13. Such disabilities accordingly increase the loss of optical connection when the optical connector 1A and 1B are connected each other.

In the present embodiment, the average particle size of filler included in the ferrule 3A and 3B is set to be not more than 20 $\mu$m. Also, it is preferable that the maximum particle size of filler is set to be not more than 40 $\mu$m. Accordingly, the over all surface of the chamfer portion 13 becomes relatively smooth. It is preferable that the surface roughness Ra of the chamfer portion 13 is within the range between 0.01 to 2.0 $\mu$m. Here, the surface roughness in this description is the arithmetic mean surface roughness defined in JIS B0601, Z8762. To be more specific, it is calculated by following calculation. First, the roughness profile is determined. Second, this profile is folded along its center line. Finally, Ra is calculated by dividing the area between this profile and its center line with the length of the center line. The surface roughness can be controlled by adjusting the particle size distribution of the filler and doping amount of the filler. Accordingly, when the guide pins 12 fixed to the ferrule 3B are inserted to the corresponding guide pin holes 11 in the ferrule 3A, the breakage or embossment of chamfer portion 13 due to contact of the guide pin 12 to the chamfer portion 13 is restrained, so each guide pin 12 is accurately positioned in the corresponding guide pin holes 11. Also, the appearance of the friction wastage or dust etc. by friction between the guide pin 12 and chamfer portion 13 is restrained, the damage of the optical fiber is restrained. Accordingly, the loss of the optical connection when the optical connector 1A and 1B are connected is decreased, so the stable coupling/uncoupling characteristics can be obtained.

Furthermore, micrifying the particle size of the filler enhances the molding property when the molding the ferrule 3A and 3B. And it is effective to decrease the abrasion amount of drill when the chamfer portion 13 is made by drilling process so that the endurance of the drill is improved.

Figure 7:
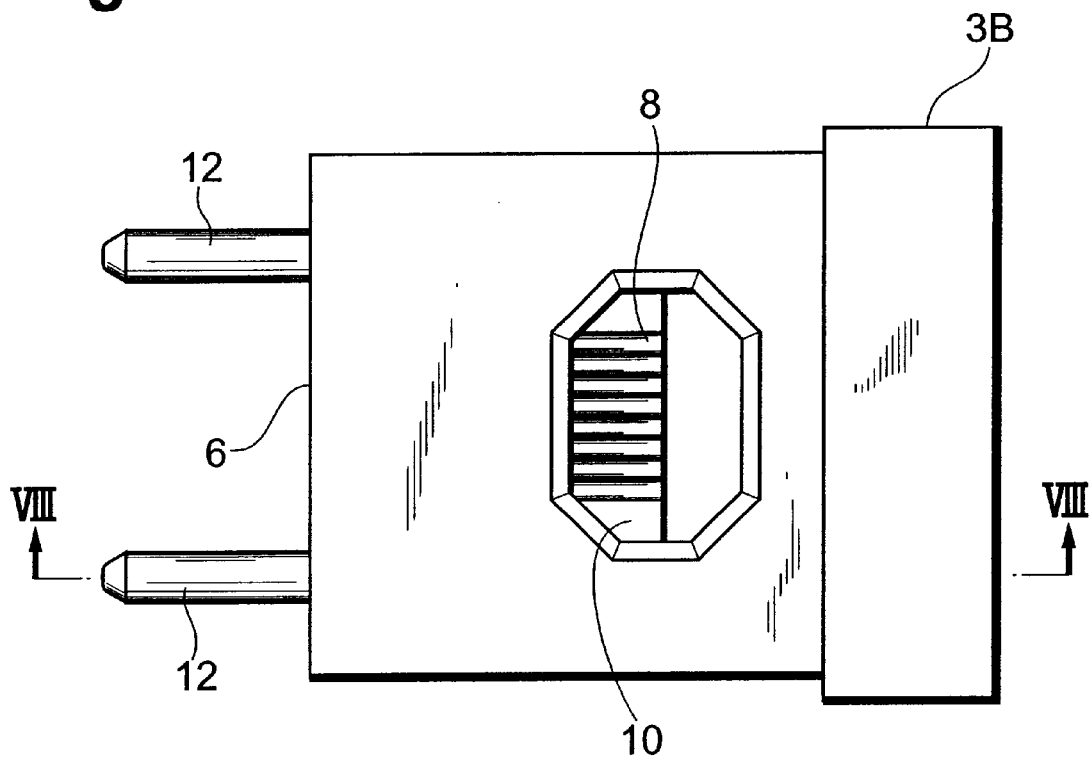
FIG. 7 is a plan view of the ferrule in the optical connector with guide pins shown in FIG. 1.
Figure 8:
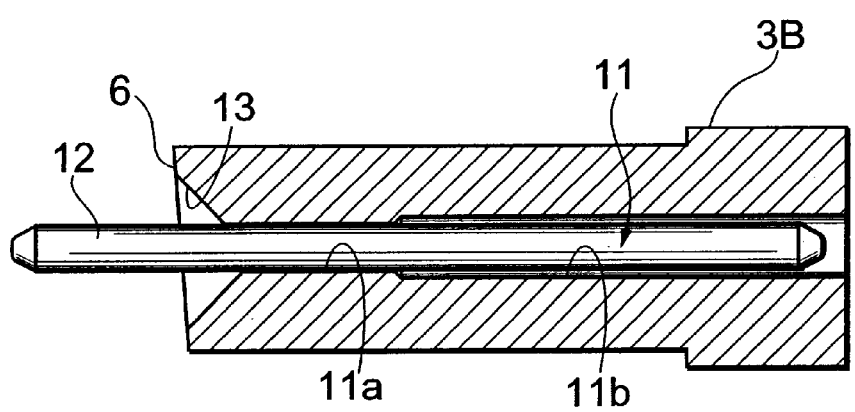
FIG. 8 is a cross-sectional view along line VIII—VIII of FIG. 7.

The ferrule 3B of the other optical connector 1B has the structure similar to the ferrule 3A of the above-stated connector 1A, as shown in FIG. 7 and FIG. 8. Guide pins 12 are inserted and fixed in the guide holes 11 of the ferrule 3B. The guide pins 12 are fixed to the ferrule 3B in a state in which they are inserted in the guide holes 11 so as to project by about 2 mm at the distal ends from the front end face 6. Only a difference between the ferrule 3B of the optical connector 1B and the aforementioned ferrule 3A is presence or absence of the guide pins 12, and thus the detailed description of the ferrule 3B is omitted herein.

The second embodiment of the ferrule for optical connector according to the present invention will be described below. FIG. 9A and FIG. 9B are views of the present embodiment, which are equivalent to FIG. 5A and FIG. 5B, respectively. The ferrule 3C of the present embodiment is different only in the makeup form of the chamfer portions 13 from the ferrule 3A (3B) of the first embodiment described above. For this reason, identical or equivalent components to those in the foregoing ferrule 3A (3B) of the first embodiment will be denoted by the same reference symbols and the detailed description thereof will be omitted.

FIG. 9A and FIG. 9B show the ferrule 3C without guide pins 12. As in the aforementioned first embodiment, the ferrule 3C without guide pins 12 is also used together with the ferrule with guide pins 12. However, since only a difference between the ferrule with guide pins 12 and the ferrule 3C shown in FIGS. 9A and 9B is presence or absence of the guide pins 12, the detailed description of the ferrule with guide pins 12 is omitted herein.

In the present embodiment, the chamfer portions 13 are formed so that the center axis $P_2$ of each chamfer portion 13 has an angle γ relative to the center axis $P_1$ of the corresponding guide hole 11. This is the case for both the pair of guide holes 11 By providing the angle γ between the center axis $P_2$ of the chamfer portion 13 and the center axis $P_1$ of the guide hole 11 in this way, the chamfer portions 13 can also be readily formed without lying off the connecting end face 6, as in the aforementioned first embodiment. Namely, the distances $L_1$ and $L_2$ in FIGS. 9A and 9B can be made approximately equal to each other.

By giving the angle between the two center axes $P_1$, $P_2$, the chamfer portions 13 can be formed without lying off the connecting end face 6, which can fully achieve the effects of the provision of the chamfer portions 13. The effects of the provision of the chamfer portions 13 involve the effect of preventing the failure in PC connection and the damage of fiber ends due to the chipping of the ends of guide holes 11, the effect of preventing the failure in PC connection due to such deformation of the ends of the guide holes as to rise on the connecting end face 6 side, the effect of improvement in the insertion property, and so on.

The foregoing angle γ herein is preferably not more than the foregoing angle α and, especially preferably, is equal to the angle α. In the present embodiment, γ=α. The guide pins 12 are guided into the guide holes 11 by the chamfer portions 13, and the guiding direction on that occasion is the direction of the center axes $P_2$ of the chamfer portions 13. Therefore, if there is a large angle between the direction of the center axes $P_2$ being the guiding direction by the chamfer portions 13 and the direction of the center axes $P_1$ of the guide holes 11 being the final insertion direction of the guide pins 12, the guide pins become pried easily and it becomes hard for the guide pins 12 to be smoothly inserted.

Specially, if the chamfer portion 13 is made by drill, it is better that the center axis P2 is perpendicular to the connecting end face 6 which would be drilled for accurately determining the drilling center position. Also, the drill can be easily stabilized when drilling. When it is difficult to equalize the angle γ to angle α, these angles may be approximate values. For balancing above mentioned matter, it is preferable that the above mentioned angle γ is set to be not more than angle α, and more preferably, the angle γ may be equal to angle α.

Further, from the viewpoint of formation of the chamfer portions 13, the most convenient configuration in terms of manufacturing is that the center axis $P_2$ of the chamfer portion 13 is normal to the connecting end face 6 (that is, the aforementioned angle γ is equal to the angle α). Especially, when the chamfer portions 13 are produced with a drill or the like, the configuration is preferable, because the cutting center position can be accurately determined in the configuration wherein the center axis $P_2$ of the chamfer portion 13 is normal to the connecting end face 6 being a cut surface. It is also preferable, because the drill is stable during the cutting. Even if the angle γ cannot be set equal to the angle α, they are preferably set to values as close to each other as possible. For satisfying the above in a good balance, the foregoing angle γ is preferably not more than the angle α and, especially preferably, is equal to the angle α.

An intersecting point (point Q in FIG. 9B) between the center axis $P_2$ of the chamfer portion 13 and the connecting end face 6 (an extension plane thereof) is preferably located inside an extension of the guide hole 11. This configuration allows the distances $L_1$ and $L_2$ in FIG. 9B to be made approximately equal to each other. Particularly, when the foregoing point Q is located on the center axis $P_1$ of the guide hole 11, the distances are set as $L_1=L_2$, which is particularly preferable.

The present invention is by no means intended to be limited to the above embodiments. For example, the optical connectors of the above embodiments were MPO connectors, but the present invention is not limited to the particular examples but can also be applied to other types of optical connectors such as the MT connectors and the like. The above embodiments were directed to the coupling between the optical connector with guide pins and the optical connector without guide pins, but the present invention is not limited to this particular example but can also be applied to a type in which optical connectors without guide pins are coupled to each other by use of two guide pins.

The aforementioned chamfer portions 13 may be made by any technique, but in the embodiments the guide holes 11 are first formed in the fixed inside diameter and thereafter the chamfer portions are formed by cutting the end with the drill. If circumstances allow, the chamfer portions 13 may be made by a die during molding of the ferrule. However, the chamfer portions 13 of the embodiments can be formed so that the center axes thereof deviate from the center axes of the guide holes 11, in this case, it is difficult to machine the die. For this reason, the working accuracy becomes higher and manufacturing becomes easier when the chamfer portions 13 are formed by postworking with the drill as described above. Since the drill is used, the form of the chamfer portions 13 is one equivalent to a part of a surface of a body of revolution.

The above mentioned chamfer portion 13 can be made no matter what method is used. In the present embodiment, the chamfer portion 13 is made at the end portion of the guide pin holes by drilling with drill after making guide pin holes having uniform inner diameter. If possible, the chamfer portion 13 may be made by molding with die when the ferrule is molded. But the center axis of the chamfer portion 13 according to the present invention may be staggered to the center axis of the guide pin holes 11, in such case it is difficult to make die for molding. As the result, making the chamfer portion 13 with drill by additional process makes high processing accuracy and eases the manufacture. And it ensures the shape of the chamfer potion 13 becomes part of a surface of a body of revolution because the drill is rotated.

Further, it is possible to make the chamfer portion with the drilling or grinding means except for drill. For example, as substitution for drill 20 shown in FIG. 4, the grindstone having same shape may be used. In this case the rotated grindstone comprised of cone-shaped metal material and the diamond grain of 1 mm average particle size electrodeposited on the surface of metal material is used. The grinding process is performed after applying the 20 to 100% alcohol solution on target place, and grinding with above mentioned grindstone which rotated 100 to 500 rotation per minute. This grinding process is especially suitable for the ferrule made of the epoxy resin, and the drilling process is suitable for the ferrule made of PPS.

In above mentioned embodiment the filler included in ferrule 3A and 3B is silica, but the filler is not restricted to silica.

The chamfer portions in the present invention are formed along the entire periphery of the guide holes and are not chipped off in part. The aforementioned angle α is provided in order to suppress the degradation of transmission loss due to the reflection at the end faces of optical fibers as described above and is about 8° in practice. The angel α is never several ten degrees.

What is claimed is:

1. A ferrule for optical connector, comprising a fiber positioning hole, a pair of guide holes into which guide pins are inserted, and a connecting end face in which ends of said fiber positioning hole and said guide holes open, having a chamfer portion equivalent to a part of a surface of a body of revolution formed at each guide hole on the said connecting end face side, and said connecting end face is formed so as to have an angle relative to a plane normal to center axes of said pair of guide holes, and wherein a center axis of each chamfer portion is parallel to the center axis of each corresponding guide hole, and positioned in an area extending from the plane passing through both center axes of said pair of guide holes toward the side where the base end side of the connecting end face exists, and wherein when said connecting end face is formed so as to have an angle of 8° relative to the plane normal to the center axes of the two guide holes, said chamfer portions are formed so that an aperture size of each chamfer portion on said connecting end face is within a range of 1.05 to 2.0 times a diameter of said guide holes.

2. A ferrule for optical connector, comprising a fiber positioning hole, a pair of guide holes into which guide pins are inserted, and a connecting end face in which ends of said fiber positioning hole and said guide holes open, having a chamfer portion equivalent to a part of a surface of a body of revolution formed at each guide hole on the said connecting end face side, and said connecting end face is formed so as to have an angle relative to a plane normal to center axes of said pair of guide holes, and wherein a center axis of each chamfer portion is parallel to the center axis of each corresponding guide hole, and positioned in an area extending from the plane passing through both center axes of said pair of guide holes toward the side where the base end side of the connecting end face exists, and wherein when said connecting end face is formed so as to have an angle of 8° relative to the plane normal to the center axes of the two guide holes, a deviation amount between the center axis of each chamfer portion and the center axis of each corresponding guide hole is 50–300 $\mu$m.

3. A ferrule for optical connector, comprising a fiber positioning hole, a pair of guide holes into which guide pins are inserted, and a connecting end face in which ends of said fiber positioning hole and said guide holes open, having a chamfer portion equivalent to a part of a surface of a body of revolution formed at each guide hole on the said connecting end face side, and wherein said connecting end face is formed so as to have an angle relative to a plane normal to center axes of said pair of guide holes, and each chamfer portion is formed so that a center axis of each chamfer portion has an angle relative to the center axis of each corresponding guide hole, wherein the angle of the center axis of each chamfer portion relative to the center axis of each guide hole is not more than the angle of said connecting end face relative to the plane normal to the center axes of said guide holes.

4. A ferrule for optical connector, comprising a fiber positioning hole, a pair of guide holes into which guide pins are inserted, and a connecting end face in which ends of said fiber position hole and said guide holes open, having a chamfer portion equivalent to a part of a surface of a body of revolution formed at each guide hole on the said connecting end face side, and wherein said connecting end face is formed so as to have an angle relative to a plane normal to center axes of said pair of guide holes, and each chamfer portion is formed so that a center axis of each chamfer portion has an angle relative to the center axis of each corresponding guide hole, wherein the angle of the center axis of each chamfer portion relative to the center axis of each guide hole is equal to the angle of said connecting end face relative to the plane normal to the center axes of said guide holes.

5. A ferrule for optical connector, comprising a fiber positioning hole, a pair of guide holes into which guide pins are inserted, and a connecting end face in which ends of said fiber positioning hole and said guide holes open, wherein a chamfer portion equivalent to a part of a surface of a body of revolution is formed at each guide hole on the said connecting end face side, and wherein said connecting end face is formed so as to have an angle relative to a plane normal to center axes of said pair of guide holes, wherein a particle size distribution of filler included in said ferrule body and doping amount of said filler are adjusted so that a surface roughness of said chamfer portion is within the range between 0.01 and 2.0 $\mu$m.

6. The ferrule for optical connector according to claim 5, further including the filler whose average particle size is not more than 20 $\mu$m.

7. The ferrule for optical connector according to claim 6, wherein the maximum particle size of said filler is not more than 40 $\mu$m.

8. The ferrule for optical connector according to claim 5, wherein said filler is silica.

9. A method of making a ferrule for optical connector, comprising one or a plurality of fiber positioning holes, a pair of guide holes into which guide pins are inserted, and a connecting end face in which ends of said fiber positioning holes and said guide holes open, comprising the steps of:

plastic molding the ferrule body having said fiber positioning hole(s) and guide pin holes, and drilling or grinding the edge of the guide pin holes at the connecting end face side so as to make a chamfer portion equivalent to a part of a surface of a body of revolution, and wherein a surface roughness of said chamfer portion is controlled between 0.01 and 2.0 $\mu$m inclusive by adjusting particle size distribution and doping amount of said filler.

10. A method of making a ferrule for optical connector according to claim 9, wherein the connecting end surface is tilted to a perpendicular plane to both center axes of said guide pins, and center axis of said body of revolution is staggered against the center axis of said guide pin.

11. A method of making a ferrule for optical connector according to claim 10, wherein center axis of said body of revolution is arranged parallel to the center axis of said guide pin.

12. A method of making a ferrule for optical connector according to claim 9, wherein said body of revolution is cone, and its tip angle is within the range between 90 to 150 degrees.

13. A method of making a ferrule for optical connector according to claim 9, wherein said drilling is made by drill having drill tip made of hard metal or diamond.

14. A method of making a ferrule for optical connector according to claim 9, wherein said ferrule body is molded with resin included filler whose average particle size is not more than 20 $\mu$m.

15. A method of making a ferrule for optical connector according to claim 14, wherein a maximum particle size of said filler is not more than 40 $\mu$m.

16. A method of making a ferrule for optical connector according to claim 9, wherein said filler is silica.

* * * * *